US012158024B2

(12) United States Patent
Tan et al.

(10) Patent No.: US 12,158,024 B2
(45) Date of Patent: Dec. 3, 2024

(54) ELECTRONIC LOCK COMPATIBLE WITH LEFT AND RIGHT OPENING AND A METHOD FOR AUTOMATICALLY JUDGING LEFT AND RIGHT OPENING OF THE ELECTRONIC LOCK

(71) Applicant: ZHONG SHAN CITY JIXIN CORE LOCK CO., LTD., Zhonghsan (CN)

(72) Inventors: Bojian Tan, Zhonghsan (CN); Juhua Zheng, Zhonghsan (CN); Haiqiang Liao, Zhonghsan (CN); Yanzhen Yu, Zhonghsan (CN)

(73) Assignee: ZHONG SHAN CITY JIXIN CORE LOCK CO., LTD., Zhonghsan (CN)

( * ) Notice: Subject to any disclaimer, the term of this patent is extended or adjusted under 35 U.S.C. 154(b) by 224 days.

(21) Appl. No.: 17/896,362

(22) Filed: Aug. 26, 2022

(65) Prior Publication Data

US 2023/0366240 A1 Nov. 16, 2023

(30) Foreign Application Priority Data

May 16, 2022 (CN) ........................ 202210530634.2

(51) Int. Cl.
*E05B 63/04* (2006.01)
*E05B 47/00* (2006.01)

(52) U.S. Cl.
CPC .......... *E05B 63/04* (2013.01); *E05B 47/0012* (2013.01); *E05B 2047/0017* (2013.01);
(Continued)

(58) Field of Classification Search
CPC ................. E05B 47/00; E05B 47/0012; E05B 2047/0013–0018; E05B 2047/002;
(Continued)

(56) References Cited

U.S. PATENT DOCUMENTS 9,528,294 B2 * 12/2016 Johnson .............. E05B 47/0012
2003/0061848 A1 * 4/2003 Morris ...................... E05C 1/16
70/107

(Continued)

FOREIGN PATENT DOCUMENTS

CN 110282054 * 9/2019
CN 110439373 * 11/2019
CN 112360240 * 2/2021

OTHER PUBLICATIONS

CN-110282054-A, Shi (Year: 2019).*
CN-110439373-A, Bai (Year: 2019).*
CN-112360240-A (Year: 2021).*

*Primary Examiner* — Nathan Cumar
(74) *Attorney, Agent, or Firm* — Birchwood IP

(57) ABSTRACT

An electronic lock compatible with left and right opening and a method for the electronic lock, comprising a lock body and a lock tongue seat, the lock body is provided with a switch knob, a rotating shaft is connected to the switch knob, and a lock tongue and a first transmission assembly are arranged on the lock tongue seat, the first transmission assembly is provided with a first rotating member, the first rotating member is provided with a front and rear through inserting slot. The rotating shaft can be inserted from a front end to a rear end of the inserting slot and can be inserted from the rear end to the front end. A driven gear is drivingly connected in the lock body, wherein a circumferential transmission mechanism is arranged between the driven gear and the switch knob, and the lock body is also provided with a sensing mechanism.

9 Claims, 7 Drawing Sheets

(52) U.S. Cl.
CPC . *E05B 2047/002* (2013.01); *E05B 2047/0036* (2013.01); *E05B 2047/0067* (2013.01); *E05B 2047/0089* (2013.01)

(58) Field of Classification Search
CPC ..... E05B 2047/0021; E05B 2047/0022; E05B 2047/0036; E05B 2047/0037; E05B 2047/0067–0069; E05B 2047/0086; E05B 63/00; E05B 63/04; E05B 63/042; E05B 63/044; E05B 63/046; E05B 63/048; G07C 9/00
USPC ........................................................... 70/277
See application file for complete search history.

(56) References Cited

U.S. PATENT DOCUMENTS

2019/0145130 A1 * 5/2019 Affan .................... E05B 47/026
292/144
2021/0348422 A1 * 11/2021 Kumar .................. E05B 17/226

* cited by examiner

ELECTRONIC LOCK COMPATIBLE WITH LEFT AND RIGHT OPENING AND A METHOD FOR AUTOMATICALLY JUDGING LEFT AND RIGHT OPENING OF THE ELECTRONIC LOCK

CROSS-REFERENCE TO RELATED APPLICATIONS

This application claims the benefit and priority of Chinese patent application No. 202210530634.2, filed on May 16, 2022, disclosure of which is hereby incorporated by reference in its entirety.

TECHNICAL FIELD

The present application relates to an electronic lock compatible with left and right opening and a method for automatically judging left and right opening of the electronic lock.

BACKGROUND

At present, in the case of common electronic locks, when the door opening direction needs to be changed, it is often necessary to disassemble and reassemble the key parts inside the electronic lock to realize the reversal. This disassembly process has a very high operating threshold, and once a part is assembled incorrectly, the door opening direction cannot be switched, and the entire electronic lock will not work properly. In addition, since the switching process of the electronic lock can be driven by the internal driving device, after changing the door opening direction, it is generally necessary to reset the driving parameters of the electronic lock, so that the driving logic and the door opening direction match each other, otherwise the electronic lock cannot perform automatic switch lock. This process often needs to be completed manually through multi-step settings, and there are certain operating thresholds.

Therefore, how to overcome the above-mentioned defects has become an important issue to be solved urgently by those skilled in the art.

SUMMARY

The invention overcomes the deficiencies of the prior art, and provides an electronic lock compatible with left and right opening and a method for automatically judging left and right opening of the electronic lock.

To achieve the above object, the present invention has adopted the following technical solutions:

An electronic lock compatible with left and right opening comprises a lock body 1 and a lock tongue seat 2, the lock body 1 is provided with a switch knob 3 for a user to turn to open and close the lock, a rotating shaft 4 that is coaxially arranged to rotate synchronously is connected to the switch knob 3, and a lock tongue 5 that can be extended/received and a first transmission assembly 6 for driving the lock tongue 5 to extend/retract are arranged on the lock tongue seat 2, wherein the first transmission assembly 6 is provided with a first rotating member 61 capable of forward/reverse rotation to drive the lock tongue 5 to be extended/received, and the first rotating member 61 is provided with a front and rear through inserting slot 62, which is configured for the rotating shaft 4 to be inserted and connected therein, so that the first rotating member 61 can rotate synchronously with the rotating shaft 4, wherein the rotating shaft 4 can be inserted from a front end to a rear end of the inserting slot (62) so that the lock tongue 5 can be oriented to left, and can be inserted from the rear end to the front end of the inserting slot 62 so that the lock tongue 5 can be oriented to right, wherein a driven gear 8 coaxially arranged with the switch knob 3 and capable of forward/reverse rotation is drivingly connected in the lock body 1 through a drive mechanism 7, wherein a circumferential transmission mechanism 9 is arranged between the driven gear and the switch knob, so that the two can rotate synchronously after they rotate in place relative to each other, and the lock body 1 is also provided with a sensing mechanism 10 for sensing whether the driven gear 8 rotates to a specific position, wherein the specific location is one or a plurality of individually identifiable ones.

Preferably, the sensing mechanism 10 comprises two stoppers 101 arranged on the driven gear 8 for synchronous rotation, and two photoelectric sensors 102 arranged in the lock body 1 and can be triggered by passing the stopper 101 when it rotates, wherein, when the driven gear 8 rotates, the moving paths of the two stoppers 101 pass through the same circle and the positions of the two stoppers 101 have a phase difference of 90°, wherein two photoelectric sensors 102 are distributed at both ends of a diameter of the circle where the paths of the stoppers 101 are located, and an initial position of one stopper 101 is located in one of the photoelectric sensors 102.

Preferably, the circumferential transmission mechanism 9 comprises a toggle block 91 that is coaxially arranged with the switch knob 3 to rotate synchronously, and a groove 92 provided on the driven gear 8 for embedding the toggle block 91 therein, wherein the toggle block 91 is provided with a fan-shaped boss 93, the groove 92 is provided with a toggle surface 94 for contacting the fan-shaped boss 93, thereby driving the switch knob 3 to rotate through the toggle block 91, when the moving gear 8 rotates, wherein a rotation virtual position 95 is provided between the toggle surface 94 and the fan-shaped boss 93, so that the driven gear 8 and the toggle block 91 rotate synchronously after the relative rotation in place.

Preferably, the inserting slot 62 is a rectangular slot, and an end of the rotating shaft 4 inserted into the inserting slot 62 is provided with a rectangular end portion 41 corresponding to the shape of the inserting slot 62, so that the first rotating member 61 can be driven to rotate when the rotating shaft 4 rotates.

Preferably, the drive mechanism 7 comprises a drive motor 71 fixed in the lock body 1 and capable of rotating in forward and reverse directions, and a drive gear 72 is connected to the drive motor 71, which rotates synchronously with the drive motor and meshes with the driven gear 8.

Preferably, the lock body 1 is further provided with a Hall sensor 11 for sensing whether the switch knob 3 is in an unlocked position and a magnet 12 that rotates synchronously with the switch knob 3 so as to trigger the hall sensor 11, the lock body 1 is also provided with a switch button 13 for automatically opening/closing the lock after being pressed, and a detection button 14 for automatically judging the left and right open states after being pressed to enter into a detection mode.

A method of automatically judging left and right opening of an electronic lock that can be applied to the electronic lock according to claim 1, comprising the following steps:

Step 1: preset the driven gear 8 at a specified specific position when leaving the factory, and the specific position is the centered state of the driven gear 8, at this time, regardless of whether the rotating shaft 4 is inserted from the front end to the rear end of the inserting slot 62 or inserted from the rear end to the front end of the inserting slot 62, a time required for the drive mechanism 7 to drive the switch knob 3 to rotate through the driven gear 8 to completely push out the lock tongue 5 from the retracted state is T;

Step 2: turn the switch knob 3 to make the lock tongue 5 in a retracted state, and then make the electronic lock enter a mode for automatically judging left and right opening;

Step 3: the drive mechanism 7 works to drive the driven gear 8 to rotate forward, and obtains time T1 that elapses from the forward rotation of the driven gear 8 driven by the drive mechanism 7 to the occurrence of blocking of the electronic lock, if T1≥T, skip to step 4, if T1<T, skip to step 5;

Step 4: judge that the lock tongue 5 is in a first assembly direction, set the electronic lock to a first assembly direction mode, the drive mechanism 7 works to drive the driven gear 8 to reset to the centered state, and the electronic lock sends out a successful judgment prompt and ends the judgment;

Step 5: the drive mechanism 7 works to drive the driven gear 8 back to the centered state, and the drive mechanism 7 continues to work to drive the driven gear 8 to reverse, obtain time T2 that elapsed from the reverse rotation of the driven gear 8 driven by the driven mechanism 7 to the occurrence of blocking, if T2≥T, skip to step 6, and if T2<T, skip to step 7;

Step 6: judge that the lock tongue 5 is in a second assembly direction, set the electronic lock to a second assembly direction mode, the drive mechanism 7 works to drive the driven gear 8 to reset to the centered state, and the electronic lock sends out a successful judgment prompt and ends the judgment;

Step 7: execute abnormality processing.

Preferably, the abnormality processing comprises: record the number of times M of the abnormality processing; if M=1, the drive mechanism 7 works to drive the driven gear 8 to reset to the centered state, and the electronic lock sends out a warning and then skips to step 3; if M=2, the electronic lock will send out a judgment failure prompt and end the judgment.

Preferably, the first assembly direction mode is a right opening mode, and the second assembly direction mode is a left opening mode; or the first assembly direction mode is a left opening mode, and the second assembly direction mode is a right opening mode.

Preferably, the electronic lock can record the working time of the drive mechanism 7, and the electronic lock can also detect the magnitude of the drive current of the drive mechanism 7, so as to judge that the driven gear 8 is blocked when the drive current exceeds a preset value.

Compared with the prior art, the beneficial effects of the present invention are:

1. The switch knob of the electronic lock of the present application is connected with a rotating shaft that is coaxially arranged to rotate synchronously, and the rotating shaft and the lock tongue are connected by a first transmission assembly. Regardless of whether the locking tongue is facing left or right, the rotating shaft can be inserted into the inserting slot of the first rotating member. In this way, the direction of the lock tongue can be changed only by changing the direction in which the rotating shaft is inserted into the inserting slot when switching left and right open, without disassembling and assembling other key parts. This greatly reduces the operating threshold for switching the door opening direction, and greatly reduces the probability that the electronic lock cannot work properly due to errors in disassembling and assembling parts. At the same time, the lock body of the present application is also driven and connected with a driven gear that can forward/reverse through a drive mechanism, and a circumferential transmission mechanism is arranged between the driven gear and the switch knob, so that the two can rotate synchronously after they rotate in place relative to each other. In this way, the switch knob can be rotated to open and close the lock, either manually or by a drive mechanism. In addition, the lock body of the present application is also provided with a sensing mechanism for sensing whether the driven gear rotates to a specific position, so that the position of the driven gear can be obtained more accurately.
2. In the judgment method of the present application, it is only necessary to preset the centered state of the driven gear at the factory. Regardless of whether the lock tongue is installed to the left or to the right, the time required for the drive mechanism to fully push out the lock tongue from the retracted state through the rotation of the driven gear to drive switch knob is T. In this way, when it is necessary to automatically judge the left and right opening directions in the future, just press the lock tongue to the retracted state and then enter the detection mode, so that the judgment of left and right opening can be completed without additional operation of the electronic lock. In the judgment method of the present application, the time T1 and T2 from the forward/reverse rotation of the driven gear to the occurrence of blocking of the driven gear are respectively compared with the time T required for the lock tongue to be completely pulled out. If T1 or T2 is greater than or equal to T, it is determined that the electronic lock is currently in the corresponding assembly direction, and then the electronic lock is set to the mode of the assembly direction and the judgment is ended after a successful judgment prompt is issued. If both T1 and T2 are less than T, it is determined that the electronic lock is in an abnormal state and then abnormal processing is performed. With the method according to the present application, the electronic lock can be automatically set to the corresponding mode without manual adjustment of the driving parameters, which is simple and convenient and greatly reduces the operation threshold.

DETAILED DESCRIPTION

Figure 1:
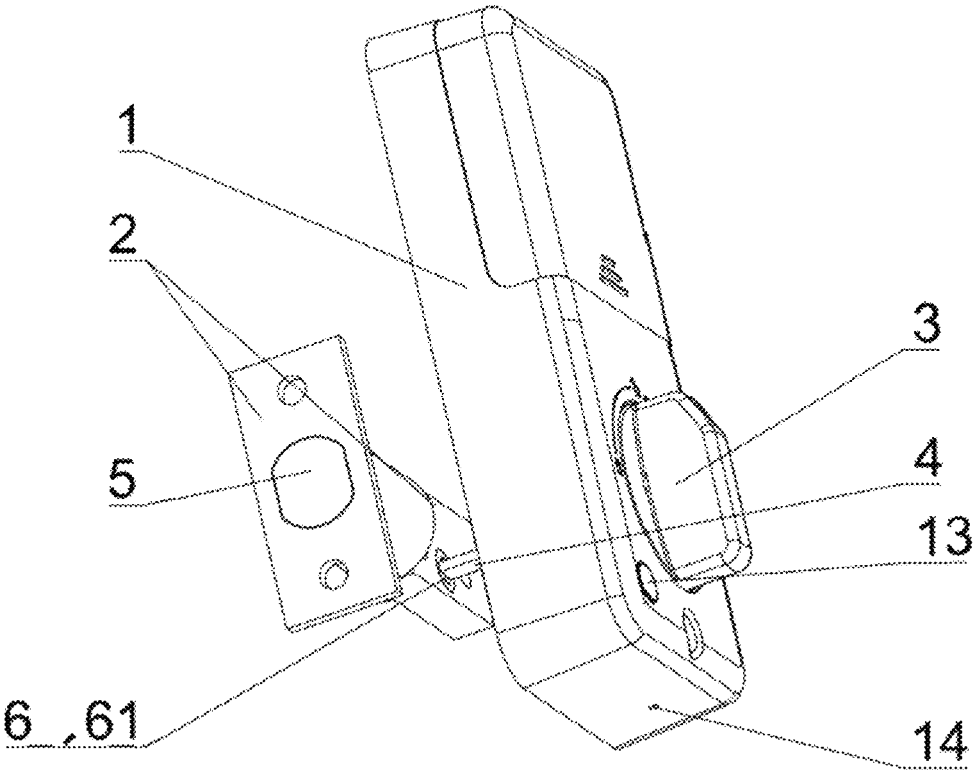
FIG. 1 is one of the schematic diagrams of the electronic lock according to the present application.
Figure 2:
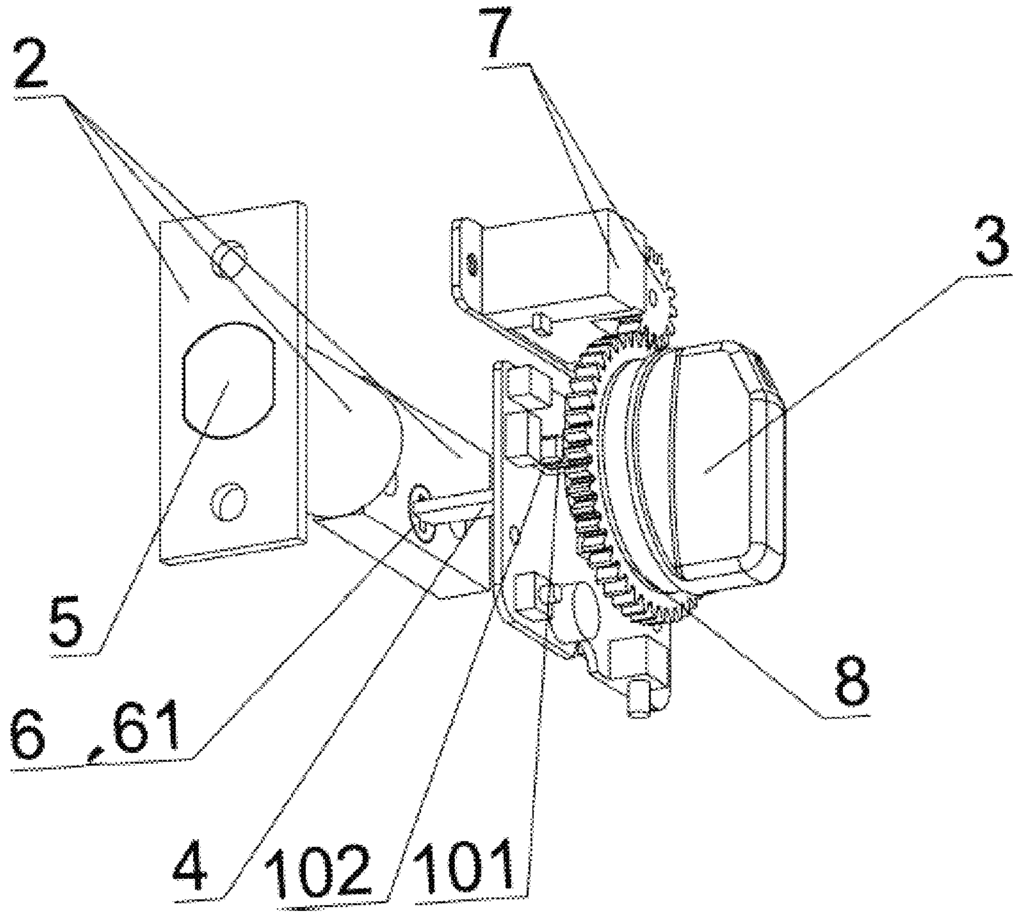
FIG. 2 is the second schematic diagram of the electronic lock according to the present application, in which the lock body is hidden.
Figure 3:
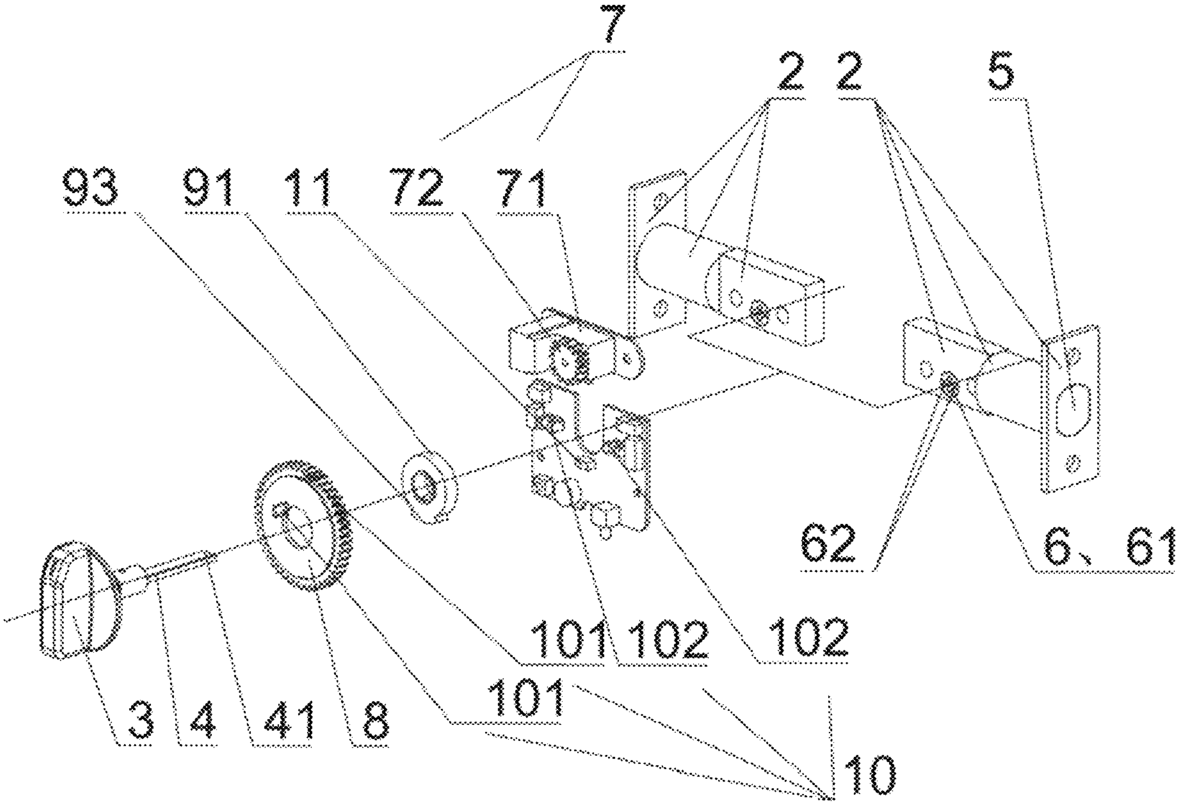
FIG. 3 is the first schematic explosive diagram of the electronic lock according to the present application, in which the lock body is hidden.
Figure 4:
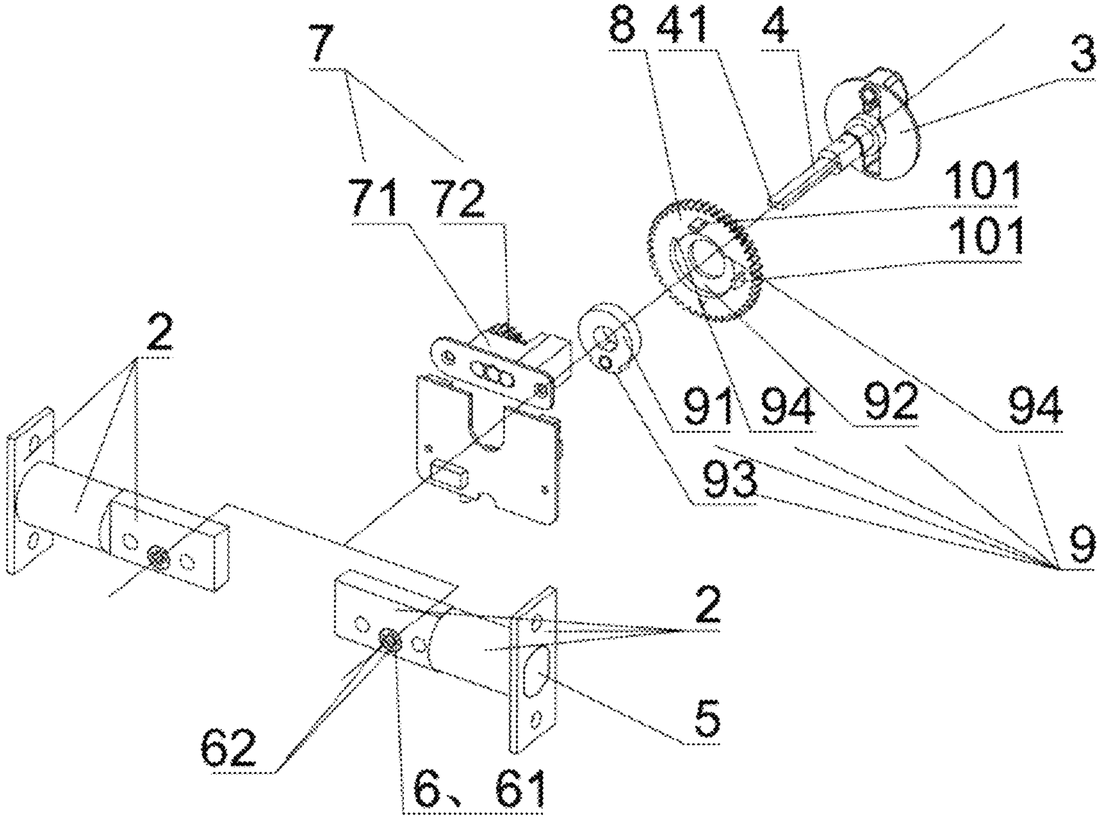
FIG. 4 is the second schematic explosive diagram of the electronic lock according to the present application, in which the lock body is hidden.
Figure 5:
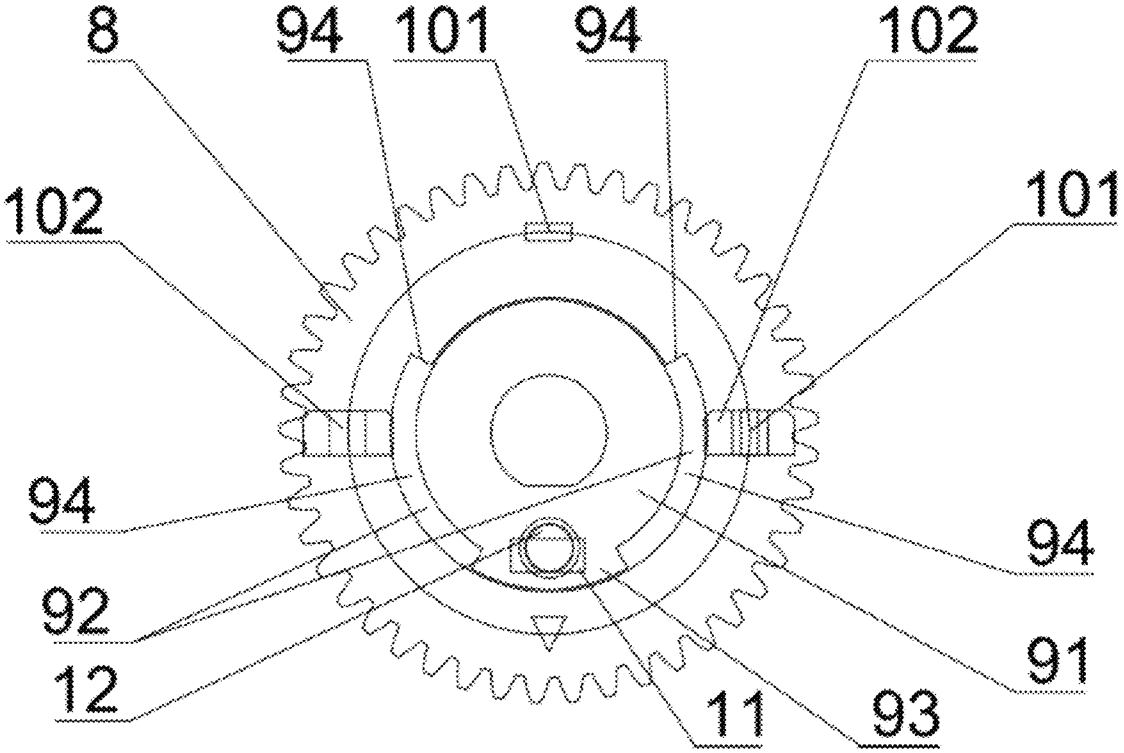
FIG. 5 is a schematic diagram of the circumferential transmission mechanism according to the present application, in which the positions of the photoelectric sensor and the Hall sensor are marked.

The features of the present invention and other related features are described in further detail below through the embodiments, so as to facilitate the understanding of those skilled in the same industry:

As shown in FIGS. 1 to 7, an electronic lock compatible with left and right opening comprises a lock body 1 and a lock tongue seat 2, the lock body 1 is provided with a switch knob 3 for a user to turn to open and close the lock, a rotating shaft 4 that is coaxially arranged to rotate synchronously is connected to the switch knob 3, and a lock tongue 5 that can be extended/received and a first transmission assembly 6 for driving the lock tongue 5 to extend/retract are arranged on the lock tongue seat 2, wherein the first transmission assembly 6 is provided with a first rotating member 61 capable of forward/reverse rotation to drive the lock tongue 5 to be extended/received, and the first rotating member 61 is provided with a front and rear through inserting slot 62, which is configured for the rotating shaft 4 to be inserted and connected therein, so that the first rotating member 61 can rotate synchronously with the rotating shaft 4, wherein the rotating shaft 4 can be inserted from a front end to a rear end of the inserting slot (62) so that the lock tongue 5 can be oriented to left, and can be inserted from the rear end to the front end of the inserting slot 62 so that the lock tongue 5 can be oriented to right, wherein a driven gear 8 coaxially arranged with the switch knob 3 and capable of forward/reverse rotation is drivingly connected in the lock body 1 through a drive mechanism 7, wherein a circumferential transmission mechanism 9 is arranged between the driven gear and the switch knob, so that the two can rotate synchronously after they rotate in place relative to each other, and the lock body 1 is also provided with a sensing mechanism 10 for sensing whether the driven gear 8 rotates to a specific position, wherein the specific location is one or a plurality of individually identifiable ones.

As mentioned above, the switch knob 3 of the electronic lock of the present application is connected with a rotating shaft 4 that is coaxially arranged to rotate synchronously, and the rotating shaft 4 and the lock tongue 5 are connected by a first transmission assembly 6. Regardless of whether the locking tongue 5 is facing left or right, the rotating shaft 4 can be inserted into the inserting slot 62 of the first rotating member 61. In this way, the direction of the lock tongue 5 can be changed only by changing the direction in which the rotating shaft 4 is inserted into the inserting slot 62 when switching left and right open, without disassembling and assembling other key parts. This greatly reduces the operating threshold for switching the door opening direction, and greatly reduces the probability that the electronic lock cannot work properly due to errors in disassembling and assembling parts. At the same time, the lock body 1 of the present application is also driven and connected with a driven gear 8 that can forward/reverse through a drive mechanism 7, and a circumferential transmission mechanism 9 is arranged between the driven gear 8 and the switch knob 3, so that the two can rotate synchronously after they rotate in place relative to each other. In this way, the switch knob 3 can be rotated to open and close the lock, either manually or by a drive mechanism. In addition, the lock body 1 of the present application is also provided with a sensing mechanism 10 for sensing whether the driven gear 8 rotates to a specific position, so that the position of the driven gear 8 can be obtained more accurately.

As shown in FIGS. 2 to 5 and FIG. 7, the sensing mechanism 10 preferably comprises two stoppers 101 arranged on the driven gear 8 for synchronous rotation, and two photoelectric sensors 102 arranged in the lock body 1 and can be triggered by passing the stopper 101 when it rotates, wherein, when the driven gear 8 rotates, the moving paths of the two stoppers 101 pass through the same circle and the positions of the two stoppers 101 have a phase difference of 90°, wherein two photoelectric sensors 102 are distributed at both ends of a diameter of the circle where the paths of the stoppers 101 are located, and an initial position of one stopper 101 is located in one of the photoelectric sensors 102. In this way, the two photoelectric sensors 102 will not be triggered at the same time, and the rotation of the driven gear 8 and whether it reaches a specific position can be determined by comparing the triggering sequence and triggering times of the two photoelectric sensors 102.

As shown in FIGS. 2 to 5 and FIG. 7, the circumferential transmission mechanism 9 preferably comprises a toggle block 91 that is coaxially arranged with the switch knob 3 to rotate synchronously, and a groove 92 provided on the driven gear 8 for embedding the toggle block 91 therein, wherein the toggle block 91 is provided with a fan-shaped boss 93, the groove 92 is provided with a toggle surface 94 for contacting the fan-shaped boss 93, thereby driving the switch knob 3 to rotate through the toggle block 91, when the moving gear 8 rotates, wherein a rotation virtual position 95 is provided between the toggle surface 94 and the fan-shaped boss 93, so that the driven gear 8 and the toggle block 91 rotate synchronously after the relative rotation in place. In this way, after the driven gear 8 and the toggle block 91 are relatively rotated in place, the driven gear 8 and the toggle block 91 are rotated synchronously through the contact between the toggle surface 94 and the fan-shaped boss 93, so that the switch knob 3 can be driven to rotate by the driven gear 8. In addition, a rotation virtual position 95 is provided between the toggle surface 94 and the fan-shaped boss 93. In this way, when the user manually rotates the switch knob 3 to drive the toggle block 91 to rotate, the fan-shaped boss 93 will not immediately contact the toggle surface 94. Therefore, the mechanical connection between the driven gear 8 and the drive mechanism 7 will not affect the user's feel when turning the switch knob 3, thereby improving the user's comfort during use.

As shown in FIGS. 1 to 5 and FIG. 7, preferably, the inserting slot 62 is a rectangular slot, and an end of the rotating shaft 4 inserted into the inserting slot 62 is provided with a rectangular end portion 41 corresponding to the shape of the inserting slot 62, so that the first rotating member 61 can be driven to rotate when the rotating shaft 4 rotates.

As shown in FIGS. 2 to 4 and FIG. 7, the drive mechanism 7 preferably comprises a drive motor 71 fixed in the lock body 1 and capable of rotating in forward and reverse directions, and a drive gear 72 is connected to the drive motor 71, which rotates synchronously with the drive motor and meshes with the driven gear 8. In this way, the forward and reverse rotation of the drive mechanism 7 can drive the driven gear 8 to rotate forward and reverse.

As shown in FIGS. 1 to 5 and FIG. 7, preferably, the lock body 1 is further provided with a Hall sensor 11 for sensing whether the switch knob 3 is in an unlocked position and a magnet 12 that rotates synchronously with the switch knob 3 so as to trigger the hall sensor 11, the lock body 1 is also provided with a switch button 13 for automatically opening/closing the lock after being pressed, and a detection button 14 for automatically judging the left and right open states after being pressed to enter into a detection mode. In this way, the current switch state of the electronic lock can be obtained through the Hall sensor 11, so that when the user presses the switch button 13, the user can better determine whether the user needs to unlock or lock, so as to avoid invalid actions of the electronic lock.

As shown in FIGS. 1 to 7, a method for automatically judging left and right opening of an electronic lock that can be applied to the above electronic lock comprises the following steps:

Step 1: preset the driven gear 8 at a specified specific position when leaving the factory, and the specific position is the centered state of the driven gear 8, at this time, regardless of whether the rotating shaft 4 is inserted from the front end to the rear end of the inserting slot 62 or inserted from the rear end to the front end of the inserting slot 62, a time required for the drive mechanism 7 to drive the switch knob 3 to rotate through the driven gear 8 to completely push out the lock tongue 5 from the retracted state is T;

Step 2: turn the switch knob 3 to make the lock tongue 5 in a retracted state, and then make the electronic lock enter a mode for automatically judging left and right opening;

Step 3: the drive mechanism 7 works to drive the driven gear 8 to rotate forward, and obtains time T1 that elapses from the forward rotation of the driven gear 8 driven by the drive mechanism 7 to the occurrence of blocking of the electronic lock, if T1≥T, skip to step 4, if T1<T, skip to step 5;

Step 4: judge that the lock tongue 5 is in a first assembly direction, set the electronic lock to a first assembly direction mode, the drive mechanism 7 works to drive the driven gear 8 to reset to the centered state, and the electronic lock sends out a successful judgment prompt and ends the judgment;

Step 5: the drive mechanism 7 works to drive the driven gear 8 back to the centered state, and the drive mechanism 7 continues to work to drive the driven gear 8 to reverse, obtain time T2 that elapsed from the reverse rotation of the driven gear 8 driven by the driven mechanism 7 to the occurrence of blocking, if T2≥T, skip to step 6, and if T2<T, skip to step 7;

Step 6: judge that the lock tongue 5 is in a second assembly direction, set the electronic lock to a second assembly direction mode, the drive mechanism 7 works to drive the driven gear 8 to reset to the centered state, and the electronic lock sends out a successful judgment prompt and ends the judgment;

Step 7: execute abnormality processing.

As mentioned above, in the judgment method of the present application, it is only necessary to preset the centered state of the driven gear 8 at the factory. Regardless of whether the lock tongue 5 is installed to the left or to the right, the time required for the drive mechanism 7 to fully push out the lock tongue 5 from the retracted state through the rotation of the driven gear 8 to drive switch knob 3 is T. In this way, when it is necessary to automatically judge the left and right opening directions in the future, just press the lock tongue 5 to the retracted state and then enter the detection mode, so that the judgment of left and right opening can be completed without additional operation of the electronic lock. In the judgment method of the present application, the time T1 and T2 from the forward/reverse rotation of the driven gear 8 to the occurrence of blocking of the driven gear 8 are respectively compared with the time T required for the lock tongue 5 to be completely pulled out. If T1 or T2 is greater than or equal to T, it is determined that the electronic lock is currently in the corresponding assembly direction, and then the electronic lock is set to the mode of the assembly direction and the judgment is ended after a successful judgment prompt is issued. If both T1 and T2 are less than T, it is determined that the electronic lock is in an abnormal state and then abnormal processing is performed. With the method according to the present application, the electronic lock can be automatically set to the corresponding mode without manual adjustment of the driving parameters, which is simple and convenient and greatly reduces the operation threshold.

Figure 6:
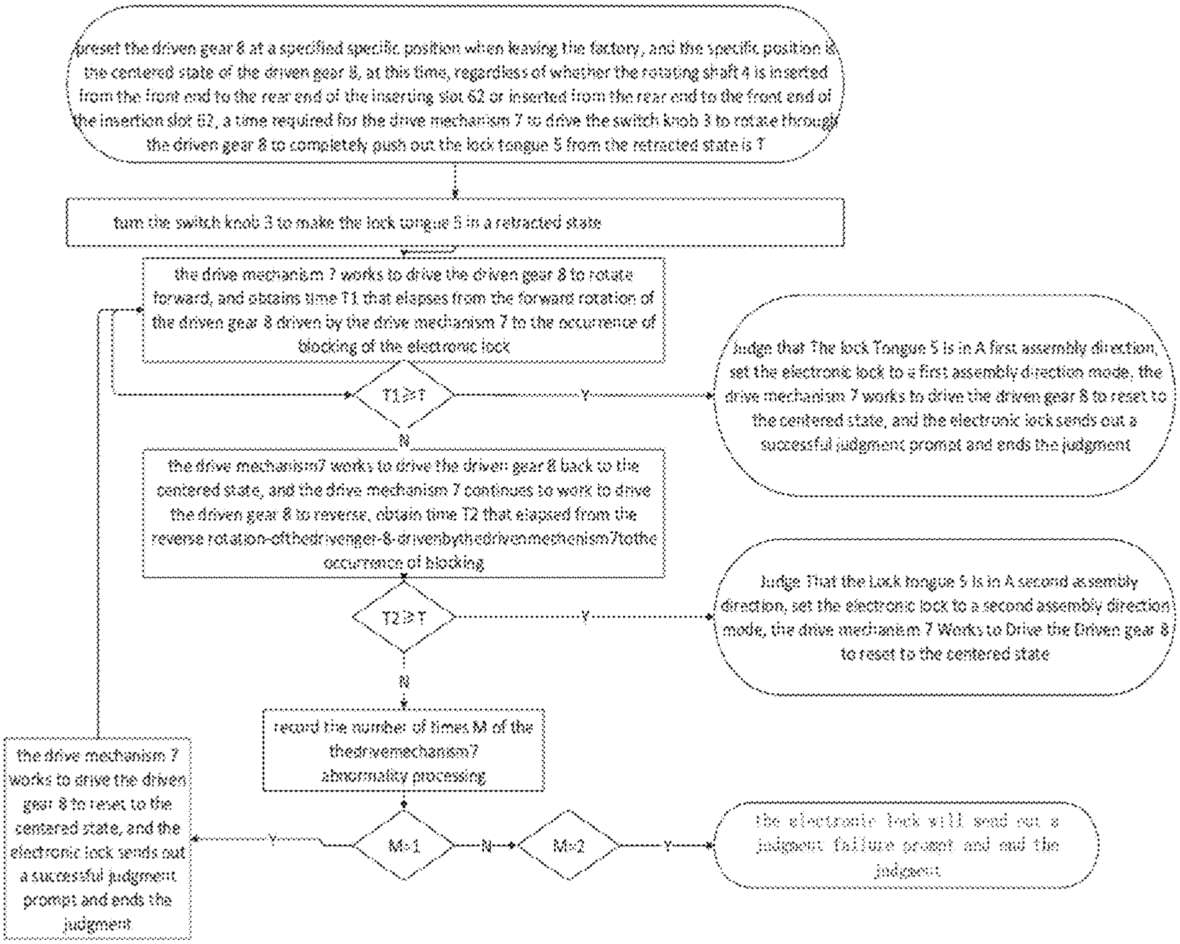
FIG. 6 is a logical schematic diagram of the method for automatically judging left and right opening according to the present application.
Figure 7:
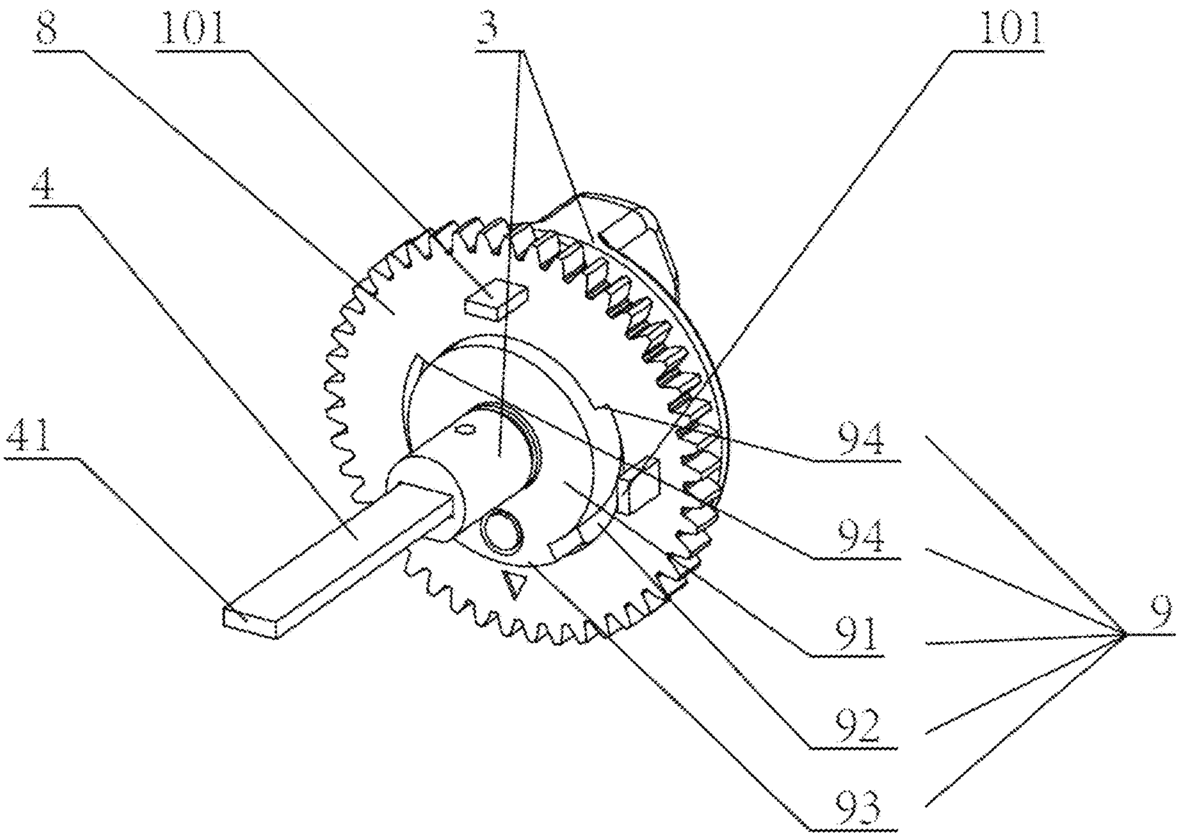
FIG. 7 is a schematic explosive diagram showing a partial of the electronic lock according to the present application.

As shown in FIG. 6, preferably the abnormality processing comprises: record the number of times M of the abnormality processing; if M=1, the drive mechanism 7 works to drive the driven gear 8 to reset to the centered state, and the electronic lock sends out a warning and then skips to step 3; if M=2, the electronic lock will send out a judgment failure prompt and end the judgment.

As mentioned above, the electronic lock will send out a warning prompt to remind the operator to observe the status of the electronic lock and re-execute the judgment when the abnormal processing is performed for the first time. If the judgment still enters the abnormal processing, a judgment failure prompt will be sent out to inform the operator and end the judgment, so that the operator can learn that the electronic lock has a certain abnormality and needs to be intervened according to the prompt issued by the electronic lock.

As shown in FIG. 6, preferably the first assembly direction mode is a right opening mode, and the second assembly direction mode is a left opening mode: or the first assembly direction mode is a left opening mode, and the second assembly direction mode is a right opening mode.

As shown in FIG. 6, preferably the electronic lock can record the working time of the drive mechanism 7, and the electronic lock can also detect the magnitude of the drive current of the drive mechanism 7, so as to judge that the driven gear 8 is blocked when the drive current exceeds a preset value.

As mentioned above, what this application protects is an electronic lock compatible with left and right opening and a method for automatically judging left and right opening of the electronic lock.

What is claimed is:

1. An electronic lock compatible with left and right opening, comprising a lock body and a lock tongue seat, the lock body is provided with a switch knob for a user to turn to open and close the lock, a rotating shaft that is coaxially arranged to rotate synchronously is connected to the switch knob, and a lock tongue that can be extended/received and a first transmission assembly for driving the lock tongue to extend/retract are arranged on the lock tongue seat, wherein the first transmission assembly is provided with a first rotating member capable of forward/reverse rotation to drive the lock tongue to be extended/received, and the first rotating member is provided with a front and rear through inserting slot, which is configured for the rotating shaft to be inserted and connected therein, so that the first rotating member can rotate synchronously with the rotating shaft, wherein the rotating shaft can be inserted from a front end to a rear end of the inserting slot so that the lock tongue can be oriented to left, and can be inserted from the rear end to the front end of the inserting slot so that the lock tongue can be oriented to right, wherein a driven gear coaxially arranged with the switch knob and capable of forward/reverse rotation is drivingly connected in the lock body through a drive mechanism, wherein a circumferential transmission mechanism is arranged between the driven gear and the switch knob, so that the the driven gear and the switch knob can rotate synchronously after they rotate in place relative to each other, and the lock body is also provided with a sensing mechanism for sensing whether the driven gear rotates to a specific position, wherein the specific location is one or a plurality of individually identifiable ones;

wherein the circumferential transmission mechanism comprises a toggle block that is coaxially arranged with the switch knob to rotate synchronously, and a groove provided on the driven gear for embedding the toggle block therein, wherein the toggle block is provided with a fan-shaped boss, the groove is provided with a toggle surface for contacting the fan-shaped boss, thereby driving the switch knob to rotate through the toggle block, when the moving gear rotates, wherein a rotation virtual position is provided between the toggle surface and the fan-shaped boss, so that the driven gear and the toggle block rotate synchronously after the relative rotation in place.

2. The electronic lock compatible with left and right opening according to claim 1, wherein the sensing mechanism comprises two stoppers arranged on the driven gear for synchronous rotation, and two photoelectric sensors arranged in the lock body and can be triggered by passing the stoppers when they rotate, wherein, when the driven gear rotates, moving paths of the two stoppers pass through the same circle and the positions of the two stoppers have a phase difference of 90°, wherein two photoelectric sensors are distributed at both ends of a diameter of the circle where the paths of the stoppers are located, and an initial position of one stopper is located in one of the photoelectric sensors.

3. The electronic lock compatible with left and right opening according to claim 1, wherein the inserting slot is a rectangular slot, and an end of the rotating shaft inserted into the inserting slot is provided with a rectangular end portion corresponding to the shape of the inserting slot, so that the first rotating member can be driven to rotate when the rotating shaft rotates.

4. The electronic lock compatible with left and right opening according to claim 1, wherein the drive mechanism comprises a drive motor fixed in the lock body and capable of rotating in forward and reverse directions, and a drive gear is connected to the drive motor, which rotates synchronously with the drive motor and meshes with the driven gear.

5. The electronic lock compatible with left and right opening according to claim 1, wherein the lock body is further provided with a Hall sensor for sensing whether the switch knob is in an unlocked position and a magnet that rotates synchronously with the switch knob so as to trigger the Hall sensor, the lock body is also provided with a switch button for automatically opening/closing the lock after being pressed, and a detection button for automatically judging the left and right open states after being pressed to enter into a detection mode.

6. A method of automatically judging left and right opening of an electronic lock that can be applied to the electronic lock according to claim 1, comprising the following steps:

step 1: preset the driven gear at a specified specific position when leaving the factory, and the specific position is the centered state of the driven gear, at this time, regardless of whether the rotating shaft is inserted from the front end to the rear end of the inserting slot or inserted from the rear end to the front end of the inserting slot, a time required for the drive mechanism to drive the switch knob to rotate through the driven gear to completely push out the lock tongue from the retracted state is T;

step 2: turn the switch knob to make the lock tongue in a retracted state, and then make the electronic lock enter a mode for automatically judging left and right opening;

step 3: the drive mechanism works to drive the driven gear to rotate forward, and obtains time T1 that elapses from the forward rotation of the driven gear driven by the drive mechanism to the occurrence of blocking of the electronic lock, if T1≥T, skip to step 4, if T1<T, skip to step 5;

step 4: judge that the lock tongue is in a first assembly direction, set the electronic lock to a first assembly direction mode, the drive mechanism works to drive the driven gear to reset to the centered state, and the electronic lock sends out a successful judgment prompt and ends the judgment;

step 5: the drive mechanism works to drive the driven gear back to the centered state, and the drive mechanism continues to work to drive the driven gear to reverse, obtain time T2 that elapsed from the reverse rotation of the driven gear driven by the driven mechanism to the occurrence of blocking, if T2≥T, skip to step 6, and if T2<T, skip to step 7;

step 6: judge that the lock tongue is in a second assembly direction, set the electronic lock to a second assembly direction mode, the drive mechanism works to drive the driven gear to reset to the centered state, and the electronic lock sends out a successful judgment prompt and ends the judgment;

step 7: execute abnormality processing.

7. The method of automatically judging left and right opening of an electronic lock according to claim 6, wherein the abnormality processing comprises:

record the number of times M of the abnormality processing;

if M=1, the drive mechanism works to drive the driven gear to reset to the centered state, and the electronic lock sends out a warning and then skips to step 3;

if M=2, the electronic lock will send out a judgment failure prompt and end the judgment.

8. The method of automatically judging left and right opening of an electronic lock according to claim 6, wherein the first assembly direction mode is a right opening mode, and the second assembly direction mode is a left opening mode;

or the first assembly direction mode is a left opening mode, and the second assembly direction mode is the right opening mode.

9. The method of automatically judging left and right opening of an electronic lock according to claim 6, wherein the electronic lock can record the working time of the drive mechanism, and the electronic lock can also detect the magnitude of the drive current of the drive mechanism, so as to judge that the driven gear is blocked when the drive current exceeds a preset value.

* * * * *